United States Patent
Patil et al.

(10) Patent No.: US 6,506,859 B1
(45) Date of Patent: Jan. 14, 2003

(54) POLYMERIZATION USING LATE TRANSITION METAL CATALYST COMPLEXES FORMED IN SITU

(75) Inventors: Abhimanyu O. Patil, Westfield, NJ (US); Robert T. Stibrany, Long Valley, NJ (US); Stephen Zushma, Clinton, NJ (US); Enock Berluche, Phillipsburg, NJ (US); Donald N. Schulz, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/642,487

(22) Filed: Aug. 18, 2000

(51) Int. Cl.$^7$ .............................. C08F 4/42; B01J 31/00
(52) U.S. Cl. ...................... 526/164; 526/348; 526/328; 526/319; 526/161; 502/155; 502/165; 502/167; 502/162
(58) Field of Search ................................ 502/155, 165, 502/167, 162; 526/348, 328, 319, 161, 164; B01J 31/00; C08F 41/42

(56) References Cited

U.S. PATENT DOCUMENTS

| | | | | |
|---|---|---|---|---|
| 5,369,073 A | * | 11/1994 | Sommazzi et al. | 502/162 |
| 5,880,241 A | | 3/1999 | Brookhart et al. | 526/348 |
| 6,037,297 A | * | 3/2000 | Stibrany et al. | 502/155 |

FOREIGN PATENT DOCUMENTS

| | | | |
|---|---|---|---|
| DE | 1251954 | 10/1967 | |
| EP | 0965600 A1 | 12/1999 | ............. C08F/4/10 |
| JP | 70040544 | 12/1970 | |
| WO | WO9630421 | 10/1996 | |
| WO | WO9806758 | 2/1998 | |
| WO | WO9930822 | 6/1999 | |
| WO | WO9955751 | 11/1999 | |

OTHER PUBLICATIONS

"Complexes of Copper with a Flexible Bis–benzimidazole Ligand," Gerald Bernardinelli, et al., CHIMIA 46(1992), pp. 155–158.
"Self–Assembly of DinuclearHelial and Nonhellical Complexes with Copper (I)," Stephane Ruttimann, et al., J Am. Chem. Soc. 1992, 114, pp. 4230–4237.
"Studies on Perchlorate Comlexes of CU(II) and Ag(I) with Substituted Benzimidazoles," N. Donappa, et al., Asian Journal of Chemistry, vol. 4, No. 4(1992), pp. 879–885.
"Synthesis, Structure, and Reactivity of Model Complexes of Copper Nitrite Reductase," Luigi Casella, et al., Inorg. Chem., 1996, 35, pp. 1101–1113.
"Synthesis, Characterisation, Antifungal and Antibacterial Studies of Nickel(II) and Silver(I) Complexes of Tridentate Bis Benzimidazoles," P. C. Vyas, et al., Asian Journal of Chemistry, vol. 9, No. 2(1997), pp. 208–212.
"Preparation and Crystal Structure of the Unusual Double-–Helical Copper(I) Complex Bis(2, 6–bis(1–methylbenzimidazol–2–yl)pyridine)dicopper(I) Naphthalene–1,5–disulfonate," Claude Piguet, et al., Inorg. Chem. 1989, 28, pp. 2920–2925.
"Copper Complexes of the "Tripod" Ligand Tris(2–benzimidazolymethyl)amine: Five–and Six–Coordinate Copper(II) Derivatives and Some Copper(I) Derivatives," Anthony W. Addison, et al., Inorganiz Chemistry, vol. 20, No. 1, 1981, pp. 103–110.
"Crystal structure of 1,3–bis(1–methylbenzimidazol–2–yl)–propane(acetonitrile )copper(I)hexafluorophosphate, $CU(C_{19}H_{20}N_4)(CH_3CN)(PF_6)$," G. Bernardinelli, Zeitschrift fur Kristallographie 203, 135–137(1993).

* cited by examiner

Primary Examiner—David W. Wu
Assistant Examiner—Ling-Siu Choi
(74) Attorney, Agent, or Firm—Joseph C. Wang

(57) ABSTRACT

The invention is directed towards the formation of polymers and copolymers using late transition metal polymerization catalyst complexes which are formed in situ. In the first process step of the instant invention, a composition having the formula $MXZ_n$ is simultaneously contacted with a ligand and an activating cocatalyst. Referring to the formula, M is selected from the group consisting of Cu, Ag, and Au; X is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, and any other moiety into which a monomer can insert; Z is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, a neutral coordinating ligand, and any other moiety into which a monomer can insert; n equals 0, 1 or 2. In the second process step of the instant invention, olefinic monomers are contacted with the activated catalyst composition under polymerization conditions.

15 Claims, No Drawings

US 6,506,859 B1

POLYMERIZATION USING LATE TRANSITION METAL CATALYST COMPLEXES FORMED IN SITU

FIELD OF THE INVENTION

The invention is directed towards the formation of polymers and copolymers using late transition metal polymerization catalyst complexes which are formed in situ.

BACKGROUND

Polymers and copolymers may be formed from olefinic monomers by using organometallic catalyst technology. Commonly used organometallic catalysts include Ziegler-Natta catalysts and metallocene catalysts. Despite the technological and commercial success of Group 4 (Ti and Zr) Ziegler-Natta and metallocene catalysts for polyolefins, the search for new catalysts and polymerization techniques continue. More specifically, the chemical industry strives to obtain even greater control over product properties and extend the family of products to new monomer combinations. Catalysts that tolerate a variety of functional groups are of particular interest because they not only open up new product possibilities, but also allow the use of cheaper, less pure monomer feeds. To this end, late transition metals are generally more tolerant of polar groups than the early transition metals.

Late transition metal catalysts have been used to a limited degree in polymerization processes. Many of these processes use free radical techniques and preformed catalyst complexes. Other techniques such as atom transfer radical polymerization ("ATRP") utilize an initiator such as an alkyl halide, a Group 11 metal compound such as CuCl, and an amine such as 2,2'-dipyridine as taught by Matyjaszewski in WO96/30421, herein incorporated by reference. The ATRP process uses an initiator in lieu of a cocatalyst (e.g., methyl alumoxane, a.k.a. "MAO"). The amine in ATRP is used to solubilize the metal compound in media. Furthermore, ATRP is known to polymerize only styrene and acrylates and is not known to polymerize other monomers such as ethylene.

Recently, novel late transition organometallic catalysts have been developed which are useful in forming polymers and copolymers having hydrocarbyl polar functionality. More specifically, U.S. Pat. No. 6,037,297 to Stibrany et al., herein incorporated by reference, details group 11 (Cu, Ag and Au) containing catalyst compositions having a pseudotetrahedral geometry. The polymerization technique disclosed in U.S. Pat. No. 6,037,297 teaches the preparation of a solid and isolated complex. The complex is a single compound that can be put in the container and stored on the bench top. Such a complex would not yet be considered an active catalyst by one skilled in the art. For the complex to be used as a catalyst for polymerization, the complex must be mixed with an activating cocatalyst, such as MAO, to create an activated catalyst which can be used to polymerize monomers. Thus, there are two discrete steps which are undertaken to create the active polymerization catalyst which makes the production of polymers and copolymers less efficient and more expensive.

Hence, there is still a need to improve the efficiency of processes for catalyst formation and polymerization. Additionally, processes which allow the incorporation of polar monomer groups are advantageous.

SUMMARY OF THE INVENTION

The instant invention provides a novel olefin polymerization process based on the use of a group 11 transition metal halide, a nitrogen containing ligand such as a bis-benzimidazole, and an activating cocatalyst (e.g., MAO) which form an activated catalyst composition in situ. This activated catalyst composition is then used to polymerize olefins and copolymerize olefins with polar monomers. Unlike ATRP, the instant invention does not use an alkyl halide initiator but instead uses a cocatalyst. Further, unlike U.S. Pat. No. 6,037,297, the invention teaches that use of a preformed metal complex is not a prerequisite. More specifically, the metal complex may be formed in-situ by adding the metal compound with a ligand at the same time cocatalyst is added. Hence, the advantages of the instant invention include an in situ method for forming an active catalyst composition which is a step-saving, cost-saving process. The invention also provides a method for polymerizing olefins as well as copolymers having polar monomers incorporated therein.

In one embodiment, the invention provides a method for producing an activated catalyst composition in situ and producing polymers therefrom comprising the steps of: (a) simultaneously contacting a composition having the formula $MXZ_n$ with L and an activating cocatalyst; wherein M is selected from the group consisting of Cu, Ag, and Au; X is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, and any other moiety into which a monomer can insert; Z is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, a neutral coordinating ligand, and any other moiety into which a monomer can insert; n equals 0, 1 or 2; L is selected from the group consisting of monodentate nitrogen-containing ligands and bidentate nitrogen-containing ligands; and, (b) contacting olefinic monomers under polymerization conditions; wherein said olefinic monomers are selected from the group consisting of acyclic aliphatic olefins, olefins having a hydrocarbyl polar functionality, mixtures of olefins having at least one olefin with a hydrocarbyl functionality and at least one acyclic aliphatic olefin; whereby polymers or copolymers are formed.

These and other features, aspects and advantages of the present invention will become better understood in view of the following description and claims.

DESCRIPTION

In one embodiment, the invention provides a method for producing an activated catalyst composition in situ and producing polymers or copolymers therefrom. It should be appreciated by those skilled in the art that use of the general term "copolymers" includes terpolymers and other polymers having various combinations of different monomer units.

In the first process step of the instant invention, a composition having the formula $MXZ_n$ is simultaneously contacted with L and an activating cocatalyst. Referring to the formula, M is selected from the group consisting of Cu, Ag, and Au; X is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, and any other moiety into which a monomer can insert; Z is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, a neutral coordinating ligand, and any other moiety into which a monomer can insert; n equals 0, 1 or 2; and L is selected from the group consisting of monodentate nitrogen-containing ligands and bidentate nitrogen-containing ligands.

In a subsequent process step of the instant invention, olefinic monomers are contacted with the activated catalyst composition under polymerization conditions. The olefinic monomers are selected from the group consisting of acyclic aliphatic olefins, olefins having a hydrocarbyl polar functionality, mixtures of olefins having at least one olefin with a hydrocarbyl polar functionality and at least one acyclic aliphatic olefin. Polymers and copolymers are thereby formed.

Examples of the activating cocatalysts used above include, but are not limited to, aluminum compounds containing an Al—O bond such as the alkylalumoxanes such as methylalumoxane ("MAO") and isobutyl modified methylalumoxane; aluminum alkyls; aluminum halides; alkylaluminum halides; Lewis acids other than any of the foregoing list; and mixtures of the foregoing can also be used in conjunction with alkylating agents, such as methyl magnesium chloride and methyl lithium. Examples of such Lewis acids are those compounds corresponding to the formula: $R'''_3B$, wherein $R'''$ independently each occurrence is selected from hydrogen, silyl, hydrocarbyl, halohydrocarbyl, alkoxide, aryloxide, fluoroaryl, amide or combinations thereof, said $R'''$ having up to 30 non-hydrogen atoms.

It is to be appreciated by those skilled in the art, that the above formula for the preferred Lewis acids represents an empirical formula, and that many Lewis acids exist as dimers or higher oligomers in solution or in the solid state. Other Lewis acids which are useful in the catalyst compositions of this invention will be apparent to those skilled in the art.

Other examples of such cocatalysts include salts of group 13 element complexes. These and other examples of suitable cocatalysts and their use in organometallic polymerization are discussed in U.S. Pat. No. 5,198,401 and PCT patent documents PCT/US97/10418 and PCT/US96/09764, all incorporated by reference herein.

Preferred activating cocatalysts include trimethylaluminum, triisobutylaluminum, methylalumoxane, ethylalumoxane, chlorodiethyaluminum, dichloroethylaluminum, triethylboron, trimethylboron, triphenylboron and halogenated, especially fluorinated, triphenyl boron compounds.

Most highly preferred activating cocatalysts include triethylaluminum, methylalumoxane, and fluoro-substituted triaryl borons such as tris(4-fluorophenyl)boron, tris(2,4-difluorophenylboron), tris(3,5-bis(trifluoromethylphenyl) boron, tris(pentafluorophenyl) boron, pentafluorophenyl-diphenyl boron, and bis(pentafluorophenyl) phenylboron. Such fluoro-substituted triarylboranes may be readily synthesized according to techniques such as those disclosed in Marks, et al., J. Am. Chem. Soc., 113, 3623–3625 (1991) which is herein incorporated by reference.

In a preferred embodiment, the activating cocatalyst is selected from the group consisting of alkylalumoxanes, aluminum alkyls, aluminum halides, alkyl aluminum halides, Lewis acids other than any of the foregoing, alkylating agents and mixtures thereof. Most preferably, the cocatalyst is methyl alumoxane.

Furthermore, the equivalent ratio of metal complex to activating cocatalyst is preferably in a range from 1:0.5 to 1:$10^4$, more preferably from 1:0.75 to 1:$10^3$. In most polymerization reactions the equivalent ratio of catalyst:polymerizable compound employed is from $10^{-12}$:1 to $10^{-1}$:1, more preferably from $10^{-9}$:1 to $10^{-4}$:1.

In another preferred embodiment, L is a nitrogen containing ligand selected from the group consisting of aromatic compounds and aliphatic compounds. Examples of nitrogen containing aromatic compounds include, but are not limited to, heterocycles such as a monodentate and bidentate ligands like a substituted or unsubstituted pyridine, aniline, pyrrole, imines, imidazoles, benzimidazoles, pyrazoles, oximes; and bipyridine. Examples of such compounds are shown below:

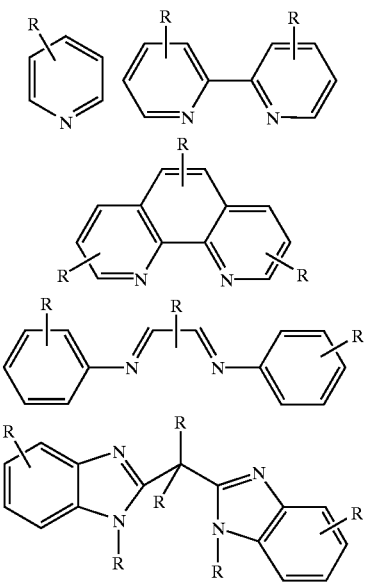

For the structures above, each R is independently selected from the group consisting of alkyl, cycloalkyl, and aromatic groups which optionally contain heteroatoms. Note that although only one or two R groups are shown above, there could be as many as 10 or more depending upon the size of aromatic rings.

Specific examples of nitrogen containing aromatic compounds include pyridine, 2,6-di-tert-butylpyridine, 2,2'-bipyridine, 4,4'-dimethyl-2,2'-bipyridyl, 4,4'-dimethyl-2,2'-bipyridyl, 5,5'-dimethyl-2,2'-bipyridyl, 6,6'-tert-butyl-2,2'-dipyridyl, 4,4'-diphenyl-2,2'-bipyridyl, 1,10-phenanthroline, 2,7-dimetyl-1,10-phenanthroline, 5,6-dimetyl-1,10-phenanthroline, 4,7-diphenyl-1,10-phenanthroline and 2,9-dimetyl-4,7-diphenyl-1,10-phenanthroline, 1,1'-bis(1-methylbenzimidazol-2-yl)-1"-methoxyethane, 3,3'-(1-ethylbenzimidazol-2-yl)-pentane, 2,2'-bis{2-(1-alkylbenzimidazol-2-yl)}biphenyl, 2,2'-bis(1-octylbenzimidazole-2yl)biphenyl, and 3,3'-bis(1-butylbenzimidazol-2yl)1"-pentane.

Examples of aliphatic amines include, but are not limited to, substituted and unsubstituted ethylenediamine, 2,2'-bipiperidine, and similar structures. Examples of these types of compounds include those having the following structures:

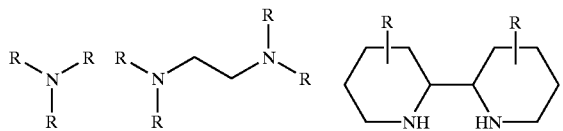

where R is independently selected from the group consisting of hydrogen, $C_1$ to $C_{20}$ alkyl; cycloalkyl, and aromatic groups which optionally contain heteroatoms. In case of ethylenediamine and propylenediamine, both may be substituted from one to four times on the amino nitrogen atom with a $C_1$ to $C_4$ alkyl group. Specific examples of nitrogen containing aliphatic compounds include N,N,N',N'-tetramethylethylenediamine, N,N,N',N'-tetraethylethylenediamine, N,N,N',N'-tetraethyl-1,3-propanediamine, N,N'-di-tert-butylethylenediamine, N,N'-dibutyl-1,6-hexanediamine, N,N-dibutyl-1,3-propanediamine, N,N'-diethylethylenediamine, N,N'-diphenylethylenediamine and 1,4-diazabicyclo[2,2,2]octane.

Olefinic monomers useful in the forming homo and copolymers with the catalyst of the invention include, for example, ethylenically unsaturated monomers, nonconjugated dienes, and oligomers, and higher molecular weight, vinyl-terminated macromers. Examples include $C_{2-20}$ olefins, vinylcyclohexane, tetrafluoroethylene, and mixtures thereof. Preferred monomers include the $C_{2-10}$ α-olefins especially ethylene, propylene, isobutylene, 1-butene, 1-hexene, 4-methyl-1-pentene, and 1-octene or mixtures of the same.

Monomers having hydrocarbyl polar functionalities useful in forming homo and copolymers with the catalyst of the invention, are vinyl ether and $C_1$ to $C_{20}$ alkyl vinyl ethers such as n-butyl vinyl ether, acrylates, such as C1 to C24, or alkyl acrylates such as t-butyl acrylate, and lauryl acrylate, as well as methacrylates such as methyl methacrylate.

In general, the polymerization may be accomplished at conditions well known in the prior art for Ziegler-Natta or Kaminsky-Sinn type polymerization reactions, that is, temperatures from −100° C. to 250° C. preferably 0° C. to 250° C., and pressures from atmospheric to 1000 atmospheres (100 Mpa). Suitable polymerization conditions include those known to be useful for metallocene catalyst when activated by aluminum or boron-activated compounds. The polymerization typically will be conducted in the presence of a solvent. Further, the polymerization will be conducted for a time sufficient to form the polymer and the polymer is recovered by techniques well known in the art and illustrated in the examples hereinafter.

Additionally, suspension, solution, slurry, gas phase or other process conditions may be employed if desired. The catalyst may be supported and such supported catalyst may be employed in the polymerizations of this invention. Preferred supports include alumina, silica, mesoporous materials, and polymeric supports.

The invention is further described in the following non-limiting examples.

EXAMPLES:

Example 1 Ethylene Polymerization

A glass lined Parr reactor was loaded in an argon glove box with 6.34 mg (0.064 mmol) of CuCl, 30 mg (0.064 mmol) of 2,2'-bipyridine was added, followed by 120 mL of toluene. Finally, 12.4 g 30% MAO (0.064 mole) was added. The Parr reactor sealed and taken to a hood containing the controller for the Parr and pressurized with 750 psig ethylene and polymerized at 60° C. for 16 hours. The reactor was cooled, vented and quenched with methanol. The polymer was soaked in MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 200 mg. Tm=137.1° C. $^1$H NMR analysis was performed using about 10 mg of sample dissolved in tetrachloroethane at 130° C. The $^1$H NMR spectrum showed only a single methylene peak at 1.3 ppm, indicating that the polyethylene is a linear straight chain polymer with little or no branching. The IR (film) spectrum of the product showed the characteristic linear crystalline polyethylene doublet absorption at 719 and 729 cm$^{-1}$. GPC (in TCB@135° C., PE calibration): Mn=58,400; Mw=228,000.

Example 2 N-(n-pentyl)-2-pyridylmethanimine (PPMI).

n-Pentylamine (20.3 g, 0.23 mol) was added dropwise to pyridine-2-carboxaldehyde (25.0 g, 0.23 mol) with stirring in an ice bath. After complete addition of the amine, anhydrous magnesium sulfate (6 g) was added and the slurry stirred for 2 hours at 25° C. The solution was filtered, solvent removed, and the product purified by distillation under reduced pressure (0.5 mm Hg at 80° C.) to give a yellow oil. Yield: 29.6 g (73%). $^1$H NMR (CDCl$_3$, 500 MHz): δ8.64 (m, 1H), 8.38 (s, 1H), 7.99 (m, 1H), 7.72 (m, 1H), 7.28 (m, 1H), 3.67 (t, 2H), 1.73 (sextet, 2H), 1.36 (overlapping quintets, 2H each), 0.90 (t, 3H), GCMS m/e 176.

Example 3 Ethylene Polymerization

A glass lined Parr reactor was loaded in an argon glove box with 12.5 mg (0.126 mmol) of CuCl, 66.8 mg (0.379 mmol) of N-(n-pentyl)-2-pyridylmethanimine (PPMI) (product of Example 2) followed by 120 mL of toluene. Next, 24.41 g of 30% MAO (0.128 mole) was added. The Parr reactor was sealed and taken to a hood containing the controller for the Parr reactor and was pressurized with 750 psig ethylene and polymerized at 60° C. for 16 hours. The reactor was cooled, vented and quenched with methanol. The polymer was soaked in a MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 260 mg. Tm=136° C. $^1$H NMR analysis was performed using about 10 mg of sample dissolved in tetrachloroethane at 130° C. The $^1$H NMR spectrum showed only a single methylene peak at 1.3 ppm, indicating that the polyethylene is linear straight chain polymer with little or no branching. The IR (film) spectrum of the product showed the characteristic linear crystalline polyethylene doublet absorption at 719 and 729 cm$^{-1}$. GPC (in TCB@135° C., PE calibration): Mn=64,600; Mw=173,000.

Example 4 Ethylene Polymerization

A glass lined Parr reactor was loaded in an argon glove box with 12.5 mg (0.126 mmol) of CuCl, 66.8 mg (0.379 mmol) of N-(n-pentyl)-2-pyridylmethanimine (PPMI) (product of Example 2) followed by 120 mL of toluene. Then, 4.85 g 30% MAO (25.3 mmole) was added. The Parr reactor was sealed and taken to a hood containing the controller for the Parr reactor and pressurized with 800 psig ethylene and polymerized at 80° C. for 16 hours. The reactor was cooled, vented and quenched with methanol. The polymer was soaked in MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 338 mg. Tm=136° C. $^1$H NMR analysis was performed using about 10 mg of sample dissolved in tetrachloroethane at 130° C. The $^1$H NMR spectrum of the product showed only a single methylene peak at 1.3 ppm, indicating that the polyethylene is linear straight chain polymer with little or no branching. The IR (film) spectrum of the product showed the characteristic linear crystalline polyethylene doublet absorption at 719 and 729 cm$^{-1}$.

Example 5 Ethylene Polymerization

The method of Example 4 was repeated, except no Cu catalyst was added. Only 120 mg of product was isolated.

Example 6 Ethylene Polymerization

A glass lined Parr reactor was loaded in an argon glove box with 12.5 mg (0.126 mmol) of CuCl, 20 mg (0.252 mmol) of pyridine followed by 120 mL of toluene. Then 24.4 g 30% MAO was added. The Parr reactor was sealed and taken to a hood containing the controller for the Parr reactor and pressurized with 750 psig ethylene and polymerized at 60° C. for 16 hours. The reactor was cooled, vented and quenched with methanol. The polymer was soaked in MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 260 mg. Tm=137.1° C. $^1$H NMR analysis was performed using about 10 mg of sample dissolved in tetrachloroethane at 130° C. $^1$H NMR spectrum of the product showed only a single methylene peak at 1.3 ppm, indicating that the polyethylene is linear straight chain polymer with little or no branching. The IR (film) spectrum of the product showed the characteristic linear crystalline polyethylene doublet absorption at 719 and 729 cm$^{-1}$. GPC (in TCB@135° C., PE calibration): Mn=106,000; Mw=241,000.

Example 7 Ethylene Polymerization

A glass lined Parr reactor was loaded in an argon glove box with 12.5 mg (0.126 mmol) of CuCl and 120 mg (1.512 mmol) of pyridine followed by 120 mL of toluene. Then 24.4 g 30% MAO was added. The Parr reactor sealed and taken to a hood containing the controller for the Parr reactor and pressurized with 750 psig ethylene and polymerized at 60° C. for 16 hours. The reactor was cooled, vented and quenched with methanol. The polymer was soaked in a MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 385 mg. Tm=135.7° C. $^1$H NMR analysis was performed using about 10 mg of sample dissolved in tetrachloroethane at 130° C. The $^1$H NMR spectrum of the product showed only a single methylene peak at 1.3 ppm, indicating that the polyethylene is linear straight chain polymer with little or no branching. The IR (film) spectrum of the product showed the characteristic linear crystalline polyethylene doublet absorption at 719 and 729 cm$^{-1}$. GPC (in TCB@135° C., PE calibration): Mn=66,800; Mw=164,000.

Example 8 Ethylene/t-butyl acrylate Copolymerization

A glass lined Parr reactor was loaded in an argon glove box with 12.5 mg (0.126 mmol) of CuCl and 66.8 mg (0.379 mmol) of N-(n-pentyl)-2-pyridylmethanimine (PPMI) followed by 30 mL of toluene. Then, 4.85 g (0.0251 moles) 30% MAO was added. A 10 g quantity of inhibitor free t-butyl acrylate was then added. The Parr reactor was sealed and taken to a hood containing the controller for the Parr reactor and pressurized with 750 psig ethylene and polymerized at 80° C. for 20 hours. The reactor was cooled, vented and quenched with methanol. The polymer was soaked in a MeOH/HCl (300 mL MeOH/100 mL 10% HCl) mixture for 24 hours to remove catalyst residues. The polymer was isolated by filtration and dried under vacuum at 60° C. for 24 hours. The yield of the copolymer was 1.9 g. The IR(film) spectrum of the product showed the ester carbonyl band at 1726 cm$^{-1}$. NMR analysis gave 31% ethylene and 69% t-butyl acrylate.

Example 9 Ethylene Polymerization

A glass lined Parr reactor was loaded in an argon glove box with 120 mL of toluene and 2.84 g of 30% MAO solution in toluene. A 5 mg quantity of CuCl$_2$.2H$_2$O (FW 170.48, 2.93×10$^{-2}$ mmol) was then added followed by 17.9 mg quantity of 2,2'-bis(1-octylbenzimidazole-2yl)biphenyl (diOctBBIL) (Al/Cu ratio of 500). The Parr reactor sealed and taken to a hood containing the controller for the Parr reactor and pressurized with 750 psig ethylene and polymerized at 60° C. for 20 hours. The reactor was cooled, vented and quenched with methanol. The polymer was soaked in MeOH/HCl (300 mL MeOH/100 mL 10% HCl) mixture for 24 hours to remove catalyst residues. The polymer was isolated by filtration and dried under vacuum at 60° C. for 24 hours. The yield of the polyethylene was 710 mg (TON 865). The IR spectrum (film) of the product showed the characteristic linear crystalline polyethylene doublet absorption at 719 and 729 cm$^{-1}$. Polymer Tm (DSC)=136.4° C., H=191.3 J/g.

Example 10 Polymerization of n-butyl acrylate

In an argon glovebox, a 30 mL septum bottle was loaded with 0.0031 g (FW 170.48, 0.02 mmol) of CuCl$_2$.2H$_2$O and 15 mL of toluene. Then a 0.0076 g (0.02 mmol) quantity of 3,3'bis(1-butylbenzimidazol-2yl)1"pentane, (dibutBBIL) ligand was added to obtain a yellow solution. A 0.88 g quantity of 30% MAO solution in toluene was then added. The yellow solution turned colorless with the MAO addition. Then, a 6 g (0.04681 mol) of n-butyl acrylate was added. The bottle was sealed in the glove box and brought into the fuming hood. The solution was heated at 60° C. for 3 h. The viscous solution was cooled to room temperature and was added into methanol/10% HCl (300:100) solution to precipitate the polymer. The product was washed with water, then methanol and dried in vacuum oven at 60° C. for 24 hours. The yield of the poly(n-butyl acrylate) was 2.23 g (37.2%, TON 870). The IR (film) spectrum of the product showed the ester carbonyl band at 1726 cm$^{-1}$. $^{13}$C NMR (ppm, CHCl$_2$CHCl$_2$): 13.7 [s, —CH$_2$—CH (COOCH$_2$CH$_2$CH$_2$CH$_3$)—], 19.2 [s, —CH$_2$—CH (COOCH$_2$CH$_2$CH$_2$CH$_3$)—], 30.8 [s, —CH$_2$—CH (COOCH$_2$CH$_2$CH$_2$CH$_3$)—], 37–34 [m, —CH$_2$CH(COOCH$_2$ CH$_2$ CH2CH$_3$)—], 41.6 [m, —CH$_2$—CH(COOCH$_2$CH$_2$CH$_2$CH$_3$)—], 64.5 [s, —CH$_2$—CH(COOCH$_2$CH$_2$CH$_2$CH$_3$)—], 174.2 [m, —CH$_2$—CH(COOCH$_2$CH$_2$CH$_2$CH$_3$)—]. The triad distribution for the poly(n-butyl acrylate) using $^{13}$C NMR was 31% rr, 53% mr, 16% mm (by integration of methylene peak) compared to the Bernoullian random model of 58% rr, 36% mr, 6% mm.

Example 11 Copolymerization of ethylene and n-butyl acrylate

A glass lined Parr reactor was loaded in an argon glove box with 0.0062 g (FW 170.48, 0.04 mmol) CuCl$_2$.2H$_2$O and 100 mL of toluene. Then a 0.001512 g (0.04 mmol) quantity of 3,3'bis(1-butylbenzimidazol-2yl)1"pentane, (dibutBBIL) ligand was added to obtain a yellow solution. A 1.53 g quantity of 30% MAO solution in toluene was then added. Then, a 5 g (FW 128.17) of n-butyl acrylate .was added.. The Parr reactor sealed and taken to a hood containing the controller for the Parr reactor and pressurized with 750 psig ethylene and polymerized at 60° C. for 20 hours. The reactor was cooled, vented and quenched with methanol. The polymer was soaked in a MeOH/HCl (300 mL MeOH/100 mL 10% HCl) mixture for 24 hours to remove catalyst resides. The polymer was isolated by filtration and dried under vacuum at 60° C. for 24 hours. The yield of the product was 500 mg. The $^{13}$C NMR of the product showed peaks due to both ethylene, as well as n-butyl acrylate. Integration of the peak indicates a copolymer composition of 42.2 mole % ethylene, and 57.8 mole % n-butyl acrylate.

Copolymer sequence distribution and the branching have been studied by $^{13}$C NM analysis. The methine carbons of the acrylate are present in three distinct clusters at 46 (EAE) 43.5 (EAA, AAE) and 41.5 (AAA) ppm. The assignment of the triad sequences is consistent with the published literature. The distribution of triads in mole % for the copolymer along with the distribution predicted by a Bernoullian model for a copolymer with 59 mole % acrylate is listed in the following table. Based on these values, the copolymer obtained from in situ copper catalyst is slightly more blocky than those obtained by a random polymerization.

TABLE 1

Triad distribution of ethylene/n-butyl acrylate copolymers

| Triad | Actual (by $^{13}$C NMR) | Bernoullian Prediction |
|---|---|---|
| EAE | 0.16 | 0.10 |
| EAA/AAE | 0.16 | 0.28 |
| AAA | 0.26 | 0.20 |

The foregoing examples clearly demonstrate that the novel method of the instant invention can be used to form activated catalyst compositions in situ. Further, the examples show how the instant invention can be used to form polymers and copoymers. Finally, the copolymers formed via the instant invention may incorporate polar monomer groups.

What is claimed is:

1. A method for producing an activated catalyst composition in situ and producing polymers or copolymers therefrom comprising the steps of:

(a) simultaneously contacting a composition having the formula $MXZ_n$ with L and an activating cocatalyst; wherein M is selected from the group consisting of Cu, Ag, and Au; X is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, and any other moiety into which a monomer can insert; Z is selected from the group consisting of halides, hydride, triflate, acetates, borates, $C_1$ through $C_{12}$ alkyl, $C_1$ through $C_{12}$ alkoxy, $C_3$ through $C_{12}$ cycloalkyl, $C_3$ through $C_{12}$ cycloalkoxy, aryl, thiolates, carbon monoxide, cyanate, olefins, a neutral coordinating ligand, and any other moiety into which a monomer can insert; n equals 0, 1 or 2; L is selected from the group consisting of monodentate nitrogen-containing ligands and bidentate nitrogen-containing ligands; and, (b) contacting olefinic monomers with the activated catalyst composition under polymerization conditions; wherein said olefinic monomers are selected from the group consisting of acyclic aliphatic olefins, olefins having a hydrocarbyl polar functionality, and mixtures of olefins having at least one olefin with a hydrocarbyl polar functionality and at least one acyclic aliphatic olefin; whereby the polymers or copolymers are formed;

wherein said activating cocatalyst is selected from the group consisting of alkylalumoxanes, aluminum alkyls, aluminum halides, alkyl aluminum halides, Lewis acids, alkylating agents and mixtures thereof, said Lewis acids being those compounds corresponding to the formula: R""$_3$B, wherein R"" independently each occurrence is selected from hydrogen, silyl, hydrocarbyl, halohydrocarbyl, alkoxide, aryloxide, fluoroaryl, amide or combinations thereof, said R"" having up to 30 non-hydrogen atoms.

2. The method of claim 1 wherein L is selected from the group consisting of aromatic compounds and aliphatic compounds and wherein L contains nitrogen.

3. The method of claim 2 wherein L is a nitrogen containing aromatic compound selected from the group consisting of a pyridine, an aniline, a pyrrole, a bipyridine, an imine, an imidazole, a benzimidazole, a pyrazole, and an oxime.

4. The method of claim 2 wherein L is selected from the group consisting of N, N, N', N'-tetramethylethylenediamine; N, N, N', N'-tetraethylethylenediamine; N, N, N', N'-tetraethyl-1,3-propanediamine; N,N'-di-tert-butylethylenediamine; N,N'-dibutyl-1,6-hexanediamine; N,N-dibutyl-1,3-propanediamine; N,N'-diethylethylenediamine; N,N'-diphenylethylenediamine; 1,4-diazabicyclo[2,2,2]octane; and 2,2'-bipiperidine.

5. The method of claim 2 wherein L is selected from the group consisting of pyridine; 2,6-di-tert-butylpyridine; 2,2'-bipyridine; 4,4'-dimethyl-2,2'-bipyridyl; 4,4'-dimethyl-2,2'-bipyridyl; 5,5'-dimethyl-2,2'-bipyridyl; 6,6'-tert-butyl-2,2'-dipyridyl; 4,4'-diphenyl-2,2'-bipyridyl; 1,10-phenanthroline; 2,7-dimetyl-1,10-phenanthroline; 5,6-dimetyl-1,10-phenanthroline; 4,7-diphenyl-1,10-phenanthroline; 2,9-dimetyl-4,7-diphenyl-1,10-phenanthroline; 1,1'-bis(1-methylbenzimidazol-2-yl)-1'-methoxyethane; 3,3'-(1-ethylbenzimidazol-2-yl)-pentane; 2,2'-bis{2-(1-alkylbenzimidazol-2-yl)}biphenyl; 2,2'-bis(1-octylbenzimidazole-2yl)biphenyl; and 3,3'-bis(1-butylbenzimidazol-2yl)1"-pentane.

6. The method of claim 1 wherein the activating cocatalyst is methyl alumoxane.

7. The method of claim 1 wherein the contacting is at a temperature in the range of from about −100° C. to about 250° C. and at pressures of from about 15 psig to about 30,000 psig.

8. The method of claim 1 wherein the contacting is conducted in a solvent.

9. The method of claim 8 wherein the solvent is an aliphatic or aromatic hydrocarbon solvent or a halogenated aromatic solvent, or mixture of thereof.

10. The method of claim 1 wherein said olefinic monomers are selected from the group consisting of (a) acyclic aliphatic olefins and (b) olefins having a hydrocarbyl polar functionality, wherein a homopolymer is formed.

11. The method of claim 1 wherein said olefinic monomers are selected from mixtures of (i) at least one olefin having a hydrocarbyl polar functionality and (ii) at least one acyclic aliphatic olefin, whereby a copolymer is formed.

12. The method of claim 1 wherein said olefinic monomers are selected from the group consisting of ethylene, propylene and 1-butene.

13. The method of claim 1 wherein said olefinic monomers are selected from the group consisting of n-butyl acrylate and t-butyl acrylate.

14. The method of claim 1 wherein said olefinic monomers are ethylene and n-butyl acrylate.

15. The method of claim 1 wherein said olefinic monomers are ethylene and t- butyl acrylate.

* * * * *